(12) United States Patent
Chang et al.

(10) Patent No.: US 9,727,780 B2
(45) Date of Patent: Aug. 8, 2017

(54) PEDESTRIAN DETECTING SYSTEM (71) Applicant: Automotive Research & Testing Center, Changhua County (TW)

(72) Inventors: Kuo-Ching Chang, Changhua County (TW); Yu-Sheng Liao, Changhua County (TW); Pang-Ting Huang, Taipei (TW); Yi-Ming Chan, Taoyuan County (TW); Li-Chen Fu, Taipei (TW); Pei-Yung Hsiao, Taipei (TW)

(73) Assignee: Automotive Research & Testing Center, Changua County (TW)

( * ) Notice: Subject to any disclaimer, the term of this patent is extended or adjusted under 35 U.S.C. 154(b) by 193 days.

(21) Appl. No.: 14/586,908

(22) Filed: Dec. 30, 2014

(65) Prior Publication Data

US 2016/0188967 A1    Jun. 30, 2016

(51) Int. Cl.
*H04N 7/18* (2006.01)
*G06K 9/00* (2006.01)
*G06K 9/46* (2006.01)
*G01B 11/14* (2006.01)

(52) U.S. Cl.
CPC .......... *G06K 9/00362* (2013.01); *G01B 11/14* (2013.01); *G06K 9/00805* (2013.01); *G06K 9/4642* (2013.01); *G06K 9/4661* (2013.01); *G06K 2009/4666* (2013.01)

(58) Field of Classification Search
CPC .......... G06K 9/00362; G06K 9/00805; G06K 9/4642; G06K 9/4661; G06K 2009/4666; G01B 11/14; G06T 7/0051; G06T 7/60

USPC .......................................................... 348/148
See application file for complete search history.

(56) References Cited

PUBLICATIONS

Milch et al., "Pedestrian detection with radar and computer vision," 2001.*
Dalal et al., "Histograms of Oriented Gradients for Human Detection," in IEEE Conference on Computer Vision and Pattern Recognition, 2005, pp. 886-893 vol. 1.*
Hyper Physics, "Gaussian Distribution Function," available at http://hyperphysics.phy-astr.gsu.edu/hbase/math/gaufcn.html, 2001.*

* cited by examiner

*Primary Examiner* — James M Anderson, II
(74) *Attorney, Agent, or Firm* — CKC & Partners Co., Ltd.

(57) ABSTRACT

A pedestrian detecting system includes a depth capturing unit, an image capturing unit and a composite processing unit. The depth capturing unit is configured to detect and obtain spatial information of a target object. The image capturing unit is configured to capture an image of the target object and recognize the image, thereby obtaining image feature information of the target object. The composite processing unit is electrically connected to the depth capturing unit and the image capturing unit, wherein the composite processing unit is configured to receive the spatial information and the image feature information and to perform a scoring scheme to detect and determine if the target object is a pedestrian. The scoring scheme performs weighted scoring on a spatial confidence and an appearance confidence to obtain a composite scoring value to determine if the target object is the pedestrian.

9 Claims, 10 Drawing Sheets

PEDESTRIAN DETECTING SYSTEM

BACKGROUND

Technical Field

The present disclosure relates to a pedestrian detecting system. More particularly, the present disclosure relates to a pedestrian detecting system applicable to an insufficiently-illuminated environment.

Description of Related Art

With a daily increasing complicated driving environment, safety requirements for driving are increasing. Many manufacturers have been devoted to developing an intelligent driving system. In addition to detecting surrounding environment, the intelligent driving system further needs to detect objects (e.g. a pedestrian or a vehicle) on the road, thereby enabling a driver to react instantly to changes of the surrounding environment.

However, when a driver is driving on the road, the pedestrian is an object that is most needed to be attended but is very difficult to be detected because the pedestrian's stance, clothes color, size and shape all have complicated changes. In order to accurately detect the pedestrian, an appearance feature and an objectness feature have to be taken in consideration. An image is generally shown with a two-dimensional plane, and the objectness feature is obtained by analyzing the appearance feature of the entire two-dimensional image. A scene at which the pedestrian located is very likely to be very complicated, which not only includes information of one single pedestrian, but also includes information of depth. For example, another pedestrian or object may be located in front of the pedestrian or behind the pedestrian, and the foreground and background involving depth information in the scene of the two-dimensional image are generally processed by similar methods. The compound foreground and background result in inaccurately detecting the pedestrian in the two-dimensional image.

For overcoming the aforementioned problem, a conventional skill uses a depth sensor such as radar. The depth sensor is used to detect a distance between the pedestrian and the vehicle in order to determine if a real pedestrian exists. However, the depth sensor merely can be used to detect the distance, but fails to detect the appearance of the pedestrian, and thus cannot accurately detect out the pedestrian.

Furthermore, the conventional pedestrian detecting system is limited to processing environments with similar luminance intensities, but is not applicable to an environment with a high contrast. For example, when a Support Vector Machine using a Histogram of Oriented Gradient and a local area vector as a combined feature, the target object recognized thereby is limited to a day-time pedestrian whose appearance is similar to data of a training model, and it is difficult to handle a target object located under an insufficiently-illuminated environment. Furthermore, the training model is mainly focused on a trained object considering the entire image, and is not suitable for recognizing the target object which only has partial ideal image regions due to the high contrast.

SUMMARY

According to one aspect of the present disclosure, a pedestrian detecting system is provided. The pedestrian detecting system includes a depth capturing unit, an image capturing unit and a composite processing unit. The depth capturing unit is configured to detect and obtain spatial information of a target object. The image capturing unit is configured to capture an image of the target object and recognize the image, thereby obtaining image feature information of the target object. The composite processing unit is electrically connected to the depth capturing unit and the image capturing unit, wherein the composite processing unit is configured to receive the spatial information and the image feature information and to perform a scoring scheme to detect and determine if the target object is a pedestrian. An appearance confidence is obtained through data transformation of the image feature information, and a spatial confidence is obtained through data transformation of the spatial information, and the scoring scheme performs weighted scoring on the spatial confidence and the appearance confidence to obtain a composite scoring value to determine if the target object is the pedestrian.

According to another aspect of the present disclosure, a pedestrian detecting system is provided. The pedestrian detecting system includes a depth capturing unit, an image capturing unit, a dynamically illuminated object detector and a composite processing unit. The depth capturing unit is configured to detect and obtain spatial information of a target object. The image capturing unit is configured to capture an image of the target object and recognize the image, thereby obtaining image feature information of the target object. The dynamically illuminated object detector is configured to obtain an ideal-illuminated image region of the target object recognized by the image capturing unit according to a relative luminance intensity of the image of the target object, and to retain the image feature information of the ideal-illuminated image region. The composite processing unit is electrically connected to the depth capturing unit and the image capturing unit, wherein the composite processing unit is configured to receive the spatial information and the image feature information, and to perform a scoring scheme to detect and determine if the target object is a pedestrian. An appearance confidence is obtained through data transformation of the image feature information, and a spatial confidence is obtained through data transformation of the spatial information, and the scoring scheme performs weighted scoring on the spatial confidence and the appearance confidence to obtain a composite scoring value to determine if the target object is the pedestrian.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1A:
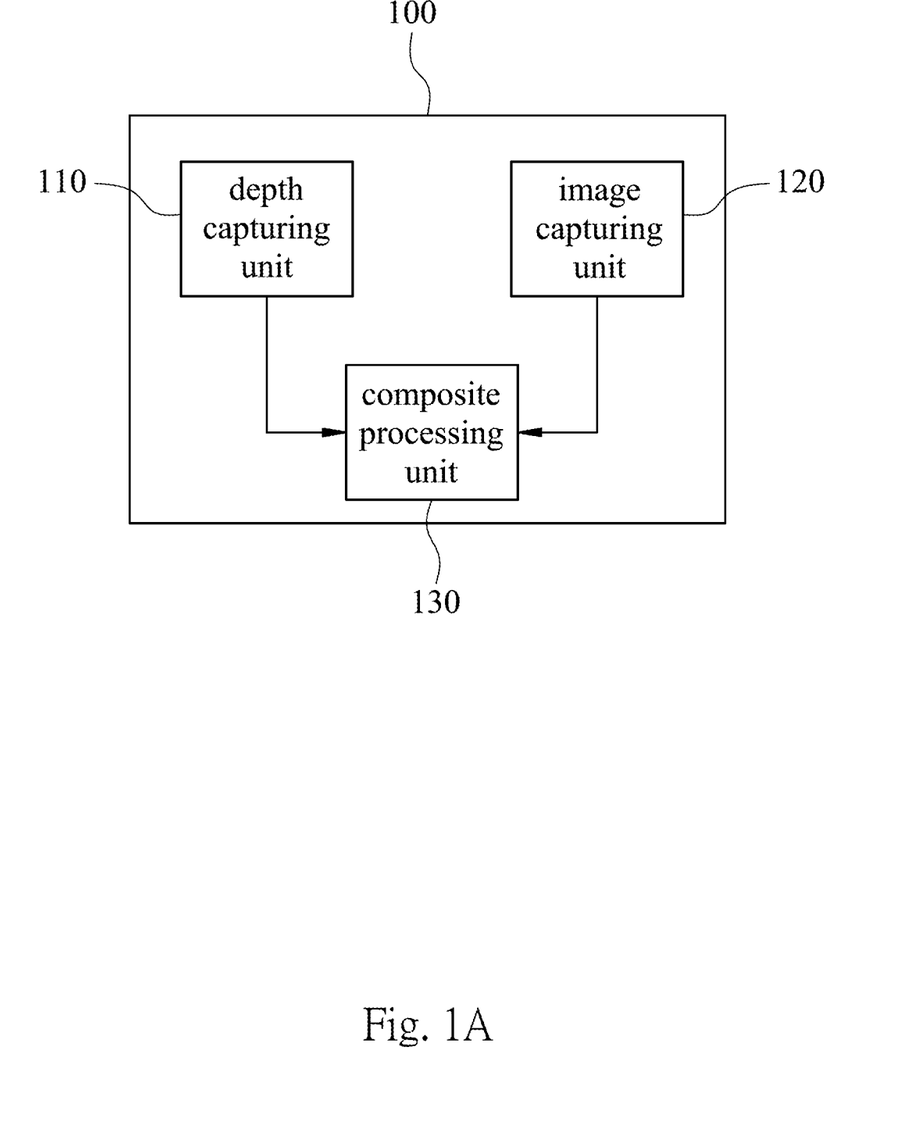
FIG. 1A is a schematic view showing a pedestrian detecting system according to one embodiment of the present disclosure.
Figure 1B:
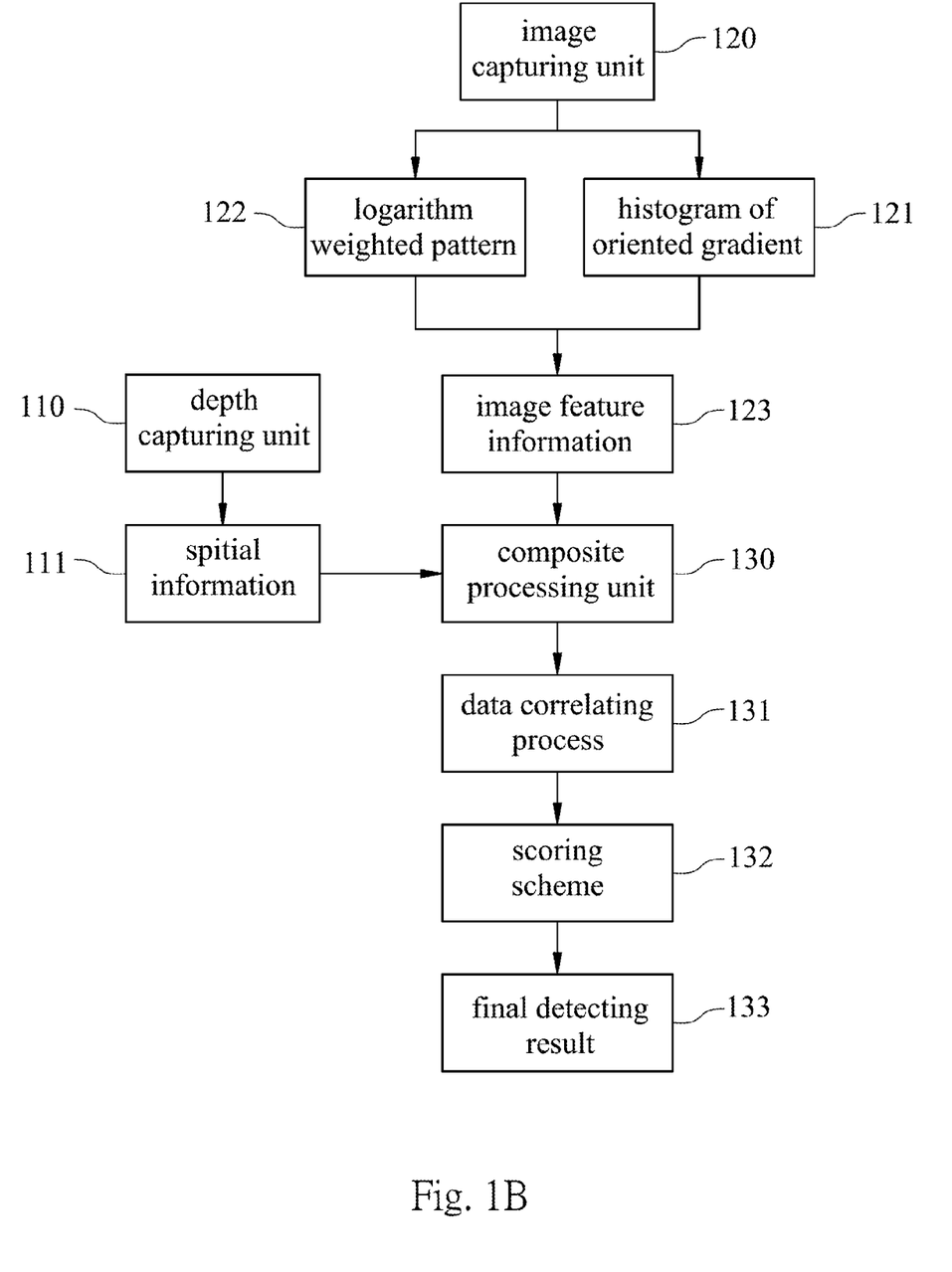
FIG. 1B is a detection flow chart performed by the pedestrian detecting system of FIG. 1.
Figure 2A:
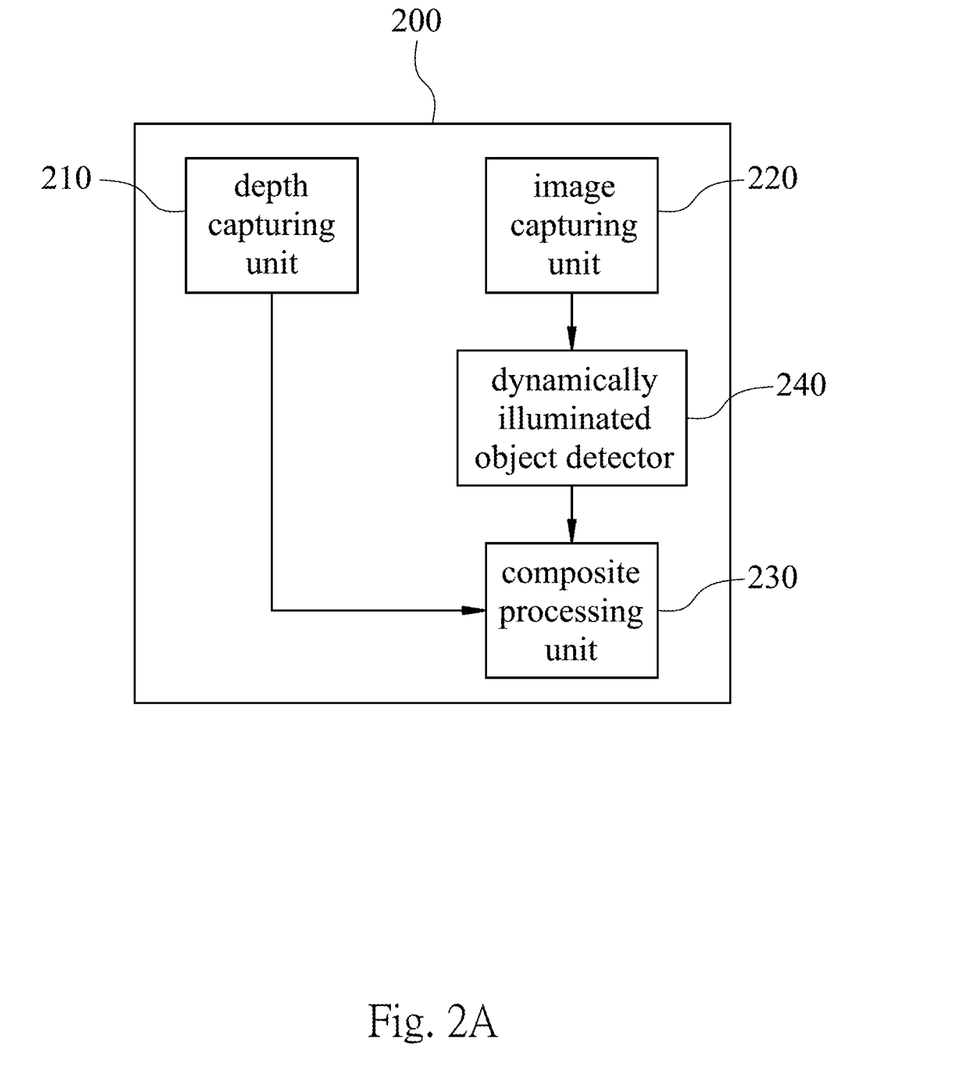
FIG. 2A is a schematic view showing a pedestrian detecting system according to another embodiment of the present disclosure.
Figure 2B:
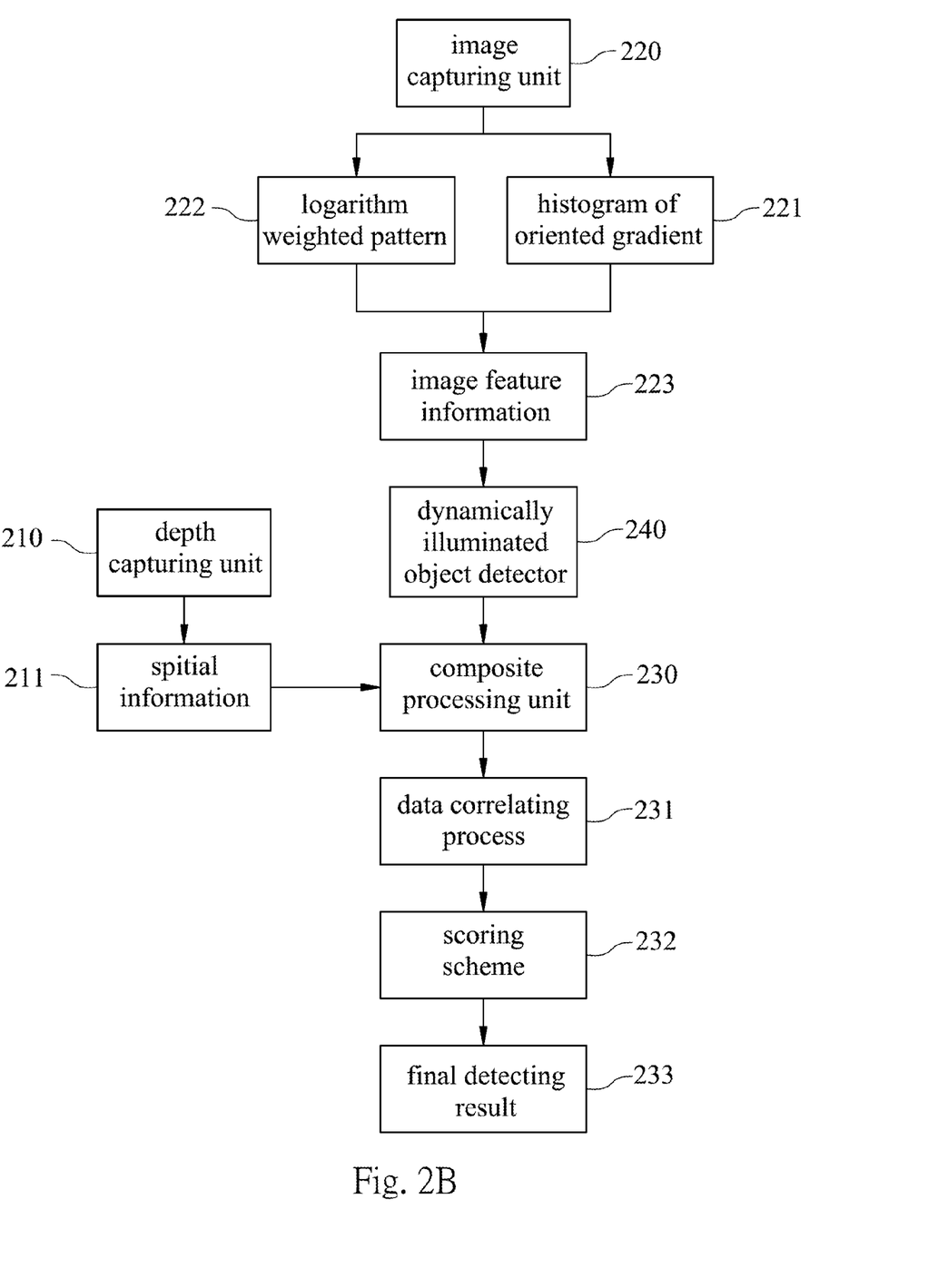
FIG. 2B is a detection flow chart performed by the pedestrian detecting system of FIG. 2A.

Simultaneously referring to FIG. 1A, FIG. 1B, FIG. 2A and FIG. 2B, FIG. 1A is a schematic view showing a pedestrian detecting system 100 according to one embodiment of the present disclosure; FIG. 1B is a detection flow chart performed by the pedestrian detecting system 100 of FIG. 1; FIG. 2A is a schematic view showing a pedestrian detecting system 200 according to another embodiment of the present disclosure; and FIG. 2B is a detection flow chart performed by the pedestrian detecting system 200 of FIG. 2A.

In FIG. 1A, the pedestrian detecting system 100 includes a depth capturing unit 110, an image capturing unit 120 and a composite processing unit 130. In another example, in FIG. 2, the pedestrian detecting system 200 includes a depth capturing unit 210, an image capturing unit 220, a composite processing unit 230 and a dynamically illuminated object detector 240.

In FIG. 1B, a flow chart of detecting a target object using the pedestrian detecting system 100 of FIG. 1A is shown. The depth capturing unit 110 is used to detect the target object to obtain spatial information 111. The spatial information 111 can be such as a coordinate of the target object or a distance between the target object and a vehicle. In one example, the depth capturing unit 110 is a radar.

An image of the target object is captured by the image capturing unit 120, and is recognized to obtain image feature information 123. Operations of a Histogram of Oriented Gradient (HOG) 121 and a Logarithm Weighted Pattern (LWP) 122 are applied to obtain the image feature information 123 that are actually required.

Through the composite processing unit 130, a data correlating process 131 and a scoring scheme 132 are performed on the spatial information 111 and the image feature information 123, and then a final detecting result is obtained.

The aforementioned scoring scheme 132 performs weighted scoring on a spatial confidence and an appearance confidence to obtain a composite scoring value to determine if the target object is the pedestrian, thereby enabling a driver to react instantly to changes of the surrounding environment.

In an embodiment, FIG. 2A and FIG. 2B respectively show how to detect a target object by using the pedestrian detecting system 200. As mentioned previously, the pedestrian detecting system 200 includes a depth capturing unit 210, an image capturing unit 220, a composite processing unit 230 and a dynamically illuminated object detector 240. Compared with the pedestrian detecting system 100, the dynamically illuminated object detector 240 is added to the pedestrian detecting system 200 to obtain an ideal-illuminated image region A2 (see FIG. 6). Similar to the pedestrian detecting system 100, after the image of the target object is captured by the image capturing unit 220, the image feature information 223 of the ideal-illuminated image region A2 can be obtained through the operations of the Histogram of Oriented Gradient 221 and the Logarithm Weighted Pattern 222. After a data correlating process 231 and a scoring scheme 232 are performed on the spatial information 211 and the image feature information 223, a final detecting result 233 can be obtained by using the composite processing unit 230. The scoring scheme 232 of the pedestrian detecting system 200 is performed mainly in accordance with the image feature information 223 of the ideal-illuminated image region A2, thereby increasing an accuracy of detecting the pedestrian in an environment with insufficient luminance. In one example, the aforementioned pedestrian detecting systems 100 and 200 are suitable for use in the environment with luminance greater than 10 lux. With the addition of the dynamically illuminated object detector 240, the aforementioned pedestrian detecting system 200 is applicable to the environment with lower luminance.

In the following embodiments, more details are described regarding how to use the pedestrian detecting system 100 to detect and determine if the target object is a real pedestrian. In the pedestrian detecting system 200, most of the components and operating processes are similar to those of the pedestrian detecting system 100. Main differences between the pedestrian detecting system 100 and the pedestrian detecting system 200 will also be described.

Figure 3:
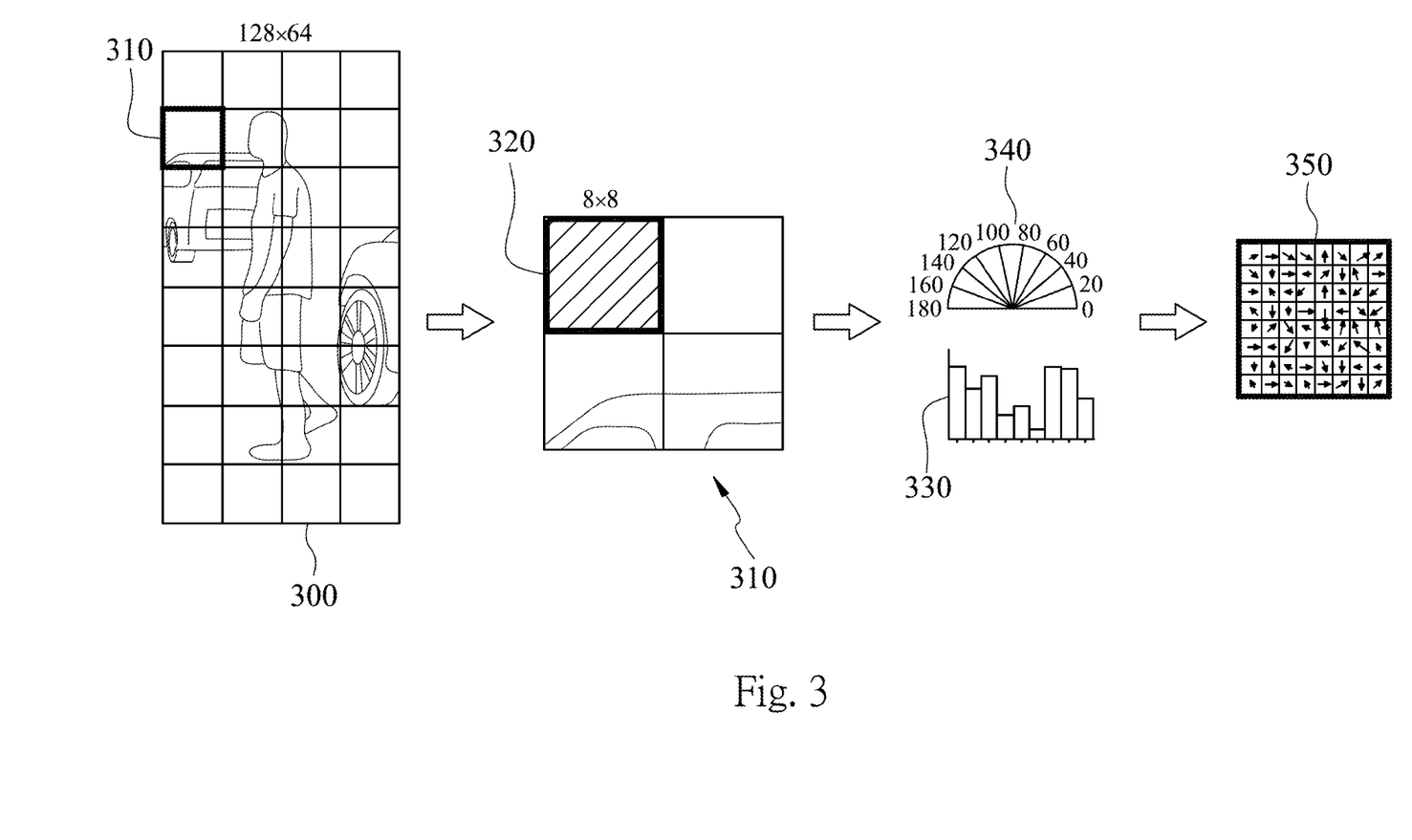
FIG. 3 is a schematic view showing obtaining the image feature information by analyzing a Histogram of Oriented Gradient.

Referring to FIG. 3, FIG. 3 is a schematic view showing obtaining the image feature information 123 by analyzing a Histogram of Oriented Gradient 121. At first, a data processing is performed on a pedestrian image 300 captured by the image capturing unit 120 to divide the pedestrian image 300 into, for example, 128×64 pixels. For increasing the efficiency of obtaining the image feature information 123, a blocking method is used to extract a block 310 of 16×16 pixels from the pedestrian image 300, and then to extract a sub-block 320 of 8×8 pixels from the block 310. A gradient operation is performed to obtain an edge intensity and an edge orientation of each pixel in the sub-block 320. Then, a statistics method is performed to obtain a distribution of the edge orientations of all of the pixels in the sub-block 320, in which the distribution is represented by a 9 dimensional vector distribution 340 of the edge orientations to construct a distribution Histogram 330. Thereafter, a feature vector distribution 350 corresponding to the sub-block 320 can be obtained, and the feature vector distribution 350 is a portion of the image feature information 123 of the sub-block 320.

Figure 4:
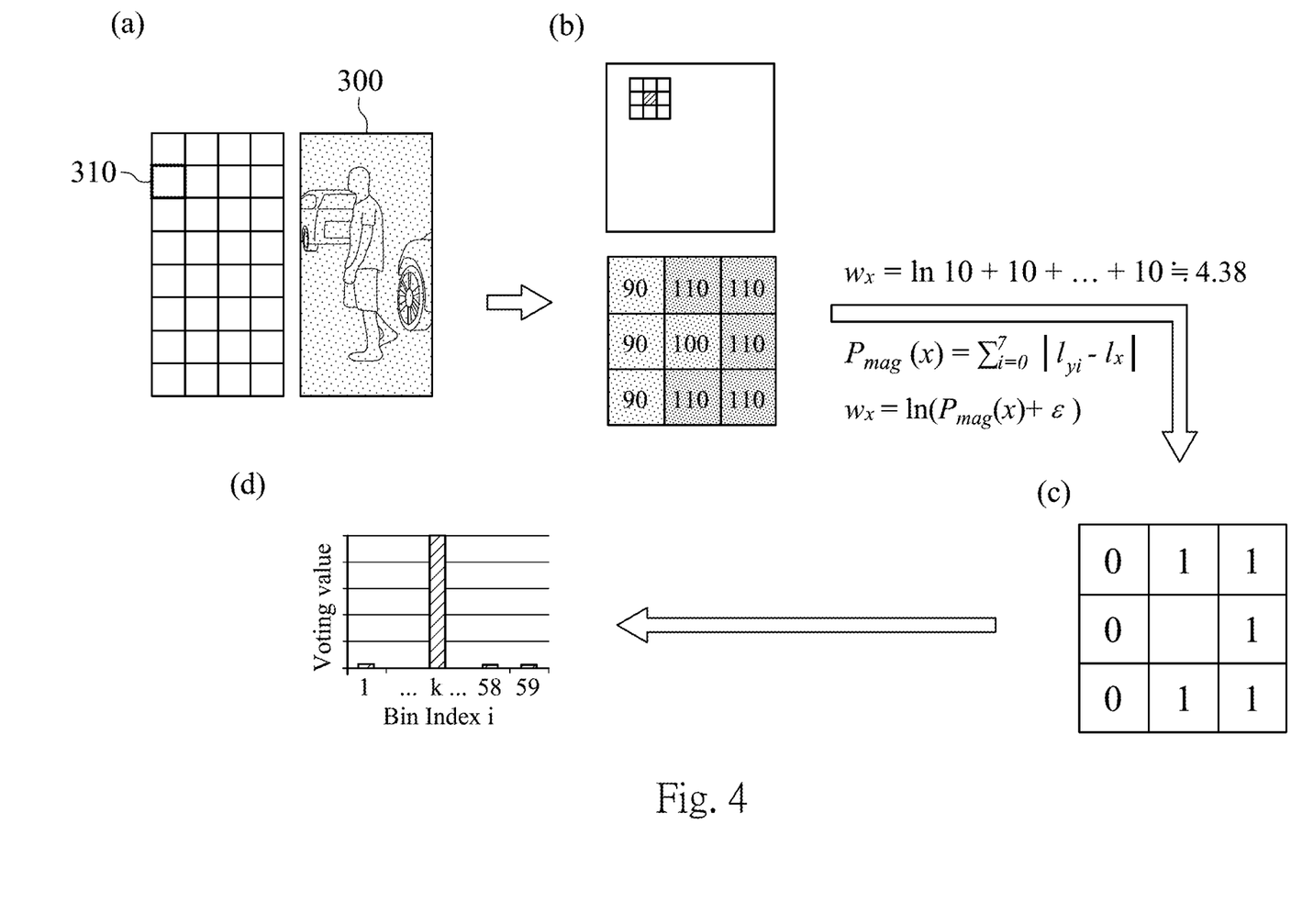
FIG. 4 is a schematic view showing obtaining the image feature information by analyzing a Logarithm Weighted Pattern.

Referring to FIG. 4, FIG. 4 is a schematic view showing obtaining the image feature information 123 by analyzing a Logarithm Weighted Pattern 122.

In FIG. 3, the image feature information 123 is obtained by using the Histogram of Oriented Gradient 121, and the shape of the image edge with stronger intensity in the pedestrian image 300 can be effectively processed. However, if the other objects are located adjacent to the pedestrian, such as trees, street lamps or pillars, misjudges are very likely to occur. Therefore, additional treatments are needed to handle the material of the target object, so as to obtain the image feature information 123 correctly. Thus, the Logarithm Weighted Pattern 122 is provided to analyze the material of the target object. The operation of Logarithm Weighted Pattern 122 includes capturing an image intensity variance of the target object, and performing a logarithm operation to obtain a portion of the image feature information 123.

In FIG. 4(a), the pedestrian image 300 in the FIG. 3 is also taken as an example. At first, the aforementioned block 310 in FIG. 3 is selected for analysis. Then, in FIG. 4(b), any one of the pixels in the block 310 is compared with its 8 neighboring pixels. If an intensity value of a central pixel is greater than that of a neighboring pixel, then the intensity value of the central pixel is set to 1; otherwise, set to 0, thereby obtaining a 8-bit binary (decimal) value as a feature value at this position, such as (01111100) shown in FIG. 4(c). Thereafter, the classification of the feature value of each block 310 is analyzed, thereby constructing a statistics diagram shown in FIG. 4(d). After all of the statistics diagrams are combined, a feature vector of the pedestrian image 300 can be obtained, thus obtaining the image feature information 123 corresponding to the pedestrian image 300.

In FIG. 4, every 0 to 1 or 1 to 0 designates a transition. Commonly, in a natural image, over 95% of the feature values have only two or less transitions. Accordingly, the feature value with two or less transitions is defined as a uniform feature value. In the pedestrian image 300, the uniform feature values can be classified to 58 bins. Furthermore, for simplifying the calculation, the transitions greater than 2 is defined as un-uniform feature values, and all the un-uniform feature values can be classified to one bin. Finally, in the statistics diagram, 59 bins can be obtained. To each bin, a corresponded voting value can be obtained. The voting value is corresponded to a weight of different intensity of the target object in each block 310.

Under an insufficiently-illuminated environment, the image captured by the image capturing unit 120 will have different luminance levels. In this situation, some over-illuminated conditions or insufficiently-illuminated conditions will lead to overlarge voting values of some specified feature values, thus generating abnormal bins. The abnormal bins will cause the inaccurate image feature information 123.

For solving the aforementioned problem caused by high contrast, the Logarithm Weighted Pattern 122 is introduced to reduce the overlarge voting values caused by the overlarge weight.

The Logarithm Weighted Pattern 122 can be represented by the following formula:

$$P_{mag}(x) = \Sigma_{i=0}^{7} |I_{y_i} - I_x| w_x = \ln(P_{mag}(x) + \epsilon) \quad (1)$$

In the formula (1), $w_x$ represents a weight parameter in a point x, and I(.) represents intensity values corresponding to the point x and a point y.

By using the logarithm function $\ln(P_{mag}(x)+\epsilon)|$, the growth speed of the weight parameter can be suppressed. Therefore, the high contrast portion of the image under the insufficiently-illuminated environment can be restrained, and the abnormal problem of the image feature information caused by the overlarge weight can be reduced.

The aforementioned embodiment shows that in the pedestrian detecting system 100, the correct image feature information 123 can be obtained by considering a shape feature extracted from the Histogram of Oriented Gradient (HOG), a material feature extracted from the Logarithm Weighted Pattern (LWP), and a luminance variance of the environment. In the following embodiments, how to collaborate the composite processing unit 130 with the depth capturing unit 110 for increasing the detecting accuracy of the pedestrian is shown. It is also shown how to use the dynamically illuminated object detector 240 of the pedestrian detecting system 200 to accurately detect the pedestrian even under the insufficiently-illuminated environment.

Figure 5:
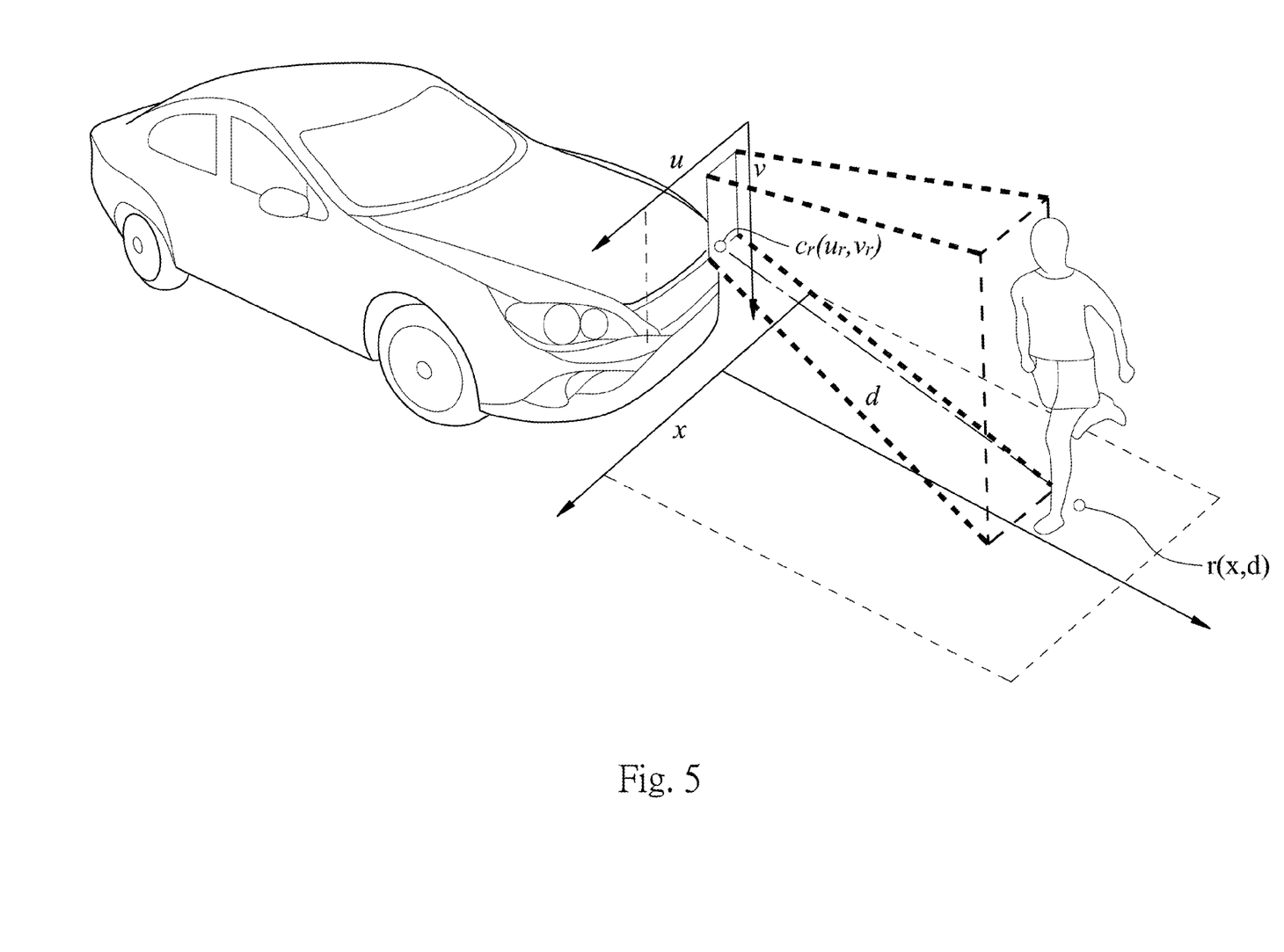
FIG. 5 is a schematic view showing the fusion of the spatial information and the corresponding image feature information according to one embodiment of the present disclosure.

FIG. 5 is a schematic view showing the fusion of the spatial information 111 and the corresponding image feature information 123 according to one embodiment of the present disclosure. As described previously, the image capturing unit 120 can only extract the feature value of the appearance of the image, but cannot handle a complicated scene with depth information.

For solving the aforementioned problem, the depth capturing unit 110 is introduced to obtain the depth information such as a distance between the pedestrian and the vehicle. Then, a composite processing unit 130 performs a data correlating process 131 to combine the spatial information 111 captured by the depth capturing unit 110 with the image feature information 123 captured by the image capturing unit 120.

The depth capturing unit 110 can use a sensing device such as radar to detect the spatial information 111 of the pedestrian. For fusing the spatial information 111 and the image feature information 123, a data transformation process is first performed. In FIG. 5, a coordinate r(x,d) represents a spatial position of the pedestrian detected by the depth capturing unit 110; and a coordinate $c_r(u_r,v_r)$ represents a point located on the image captured by the image capturing unit 120. By using the following formula, the coordinate r(x,d) can be transformed to the coordinate $c_r(u_r,v_r)$:

$$\begin{cases} u_r = u_p + \dfrac{K_u \times (x + (d + D_c) \times \tan\theta_{pan})}{(d + D_c) - x \times \tan\theta_{pan}} \\ v_r = v_p + \dfrac{K_v \times (H_c - (d + D_c) \times \tan\theta_{tilt})}{H_c \times \tan\theta_{tilt} + (d + D_c)} \end{cases} \quad (2)$$

In the formula (2), $(u_p,v_p)$ represents a position of the image point; $K_u$ and $K_v$ represent a horizontal focal length of the depth capturing unit 110 (e.g. a radar) and a vertical focal length of the depth capturing unit 110 respectively; $D_c$ represents a distance between the image capturing unit 120 (e.g. a camera) and the depth capturing unit 110; $H_c$ represents a height of the image capturing unit 120; and $\theta_{tilt}$ and $\theta_{pan}$ represents a tilt angle and a pan angle of the image capturing unit 120. After a coordinate transformation is performed according to formula (2), the subsequent process can be preceded.

Figure 6:
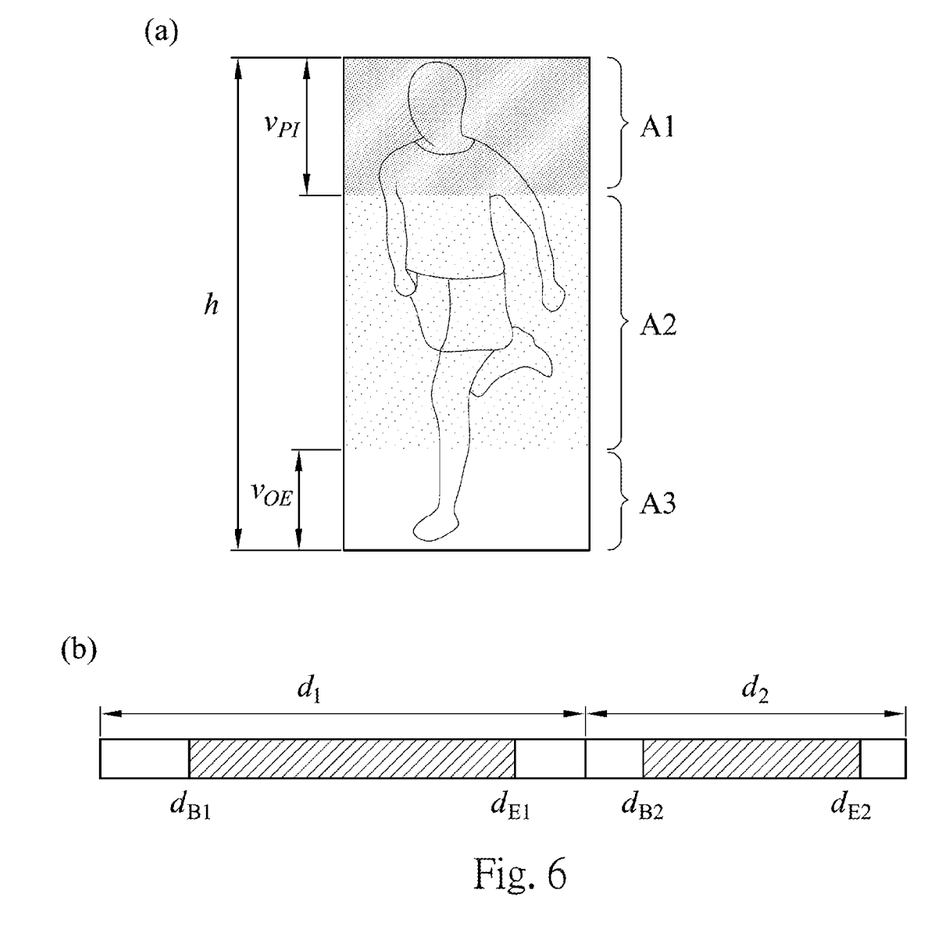
FIG. 6 is a schematic view showing obtaining an ideal-illuminated image region by using a dynamically illuminated object detector in FIG. 2A.

The aforementioned embodiments take the pedestrian detecting system 100 as an example; and similar processes can also be applied to the pedestrian detecting system 200. As mentioned previously, in the insufficiently-illuminated environment, the accuracy of detecting the pedestrian by the pedestrian detecting system 100 will be decreased. Therefore, in the pedestrian detecting system 200, the dynamically illuminated object detector 240 is introduced. FIG. 6 is a schematic view showing obtaining an ideal-illuminated image region A2 by the dynamically illuminated object detector 240 in FIG. 2A. At first, in the insufficiently-illuminated environment, the target object such as the pedestrian can be classified into three regions according to the luminance intensity distribution while being illuminated. The three regions are a low-illuminated image region A1, an ideal-illuminated image region A2 and an over-illuminated region A3. Commonly, the confidence of the detecting result is dependent on a data correlation between a feature vector and a training model. Furthermore, the scoring value of the un-uniform image region will be influenced by the uniform image area.

The low-illuminated image region A1 is usually located in an upper-half portion of the target object. By dividing the target object into upper-half and lower-half portions, a boundary point can be defined by calculating a location that has a maximum difference between the average luminance of the two portions. The boundary of the low-illuminated image region A1 can be represented by the following formulas:

$$p(u,v) \in \begin{cases} U_k & 0 \le u < w, 0 \le v < k \\ B_k & 0 \le u < w, k \le v < h \end{cases} \quad (3)$$

$$v_{PI} = \arg\max_k \left( \frac{\sum_{p \in B_k} I(p)}{|B_k|} - \frac{\sum_{p \in U_k} I(p)}{|U_k|_{11}} \right) \quad (4)$$

In the formulas (3) and (4), p(u,v) represents a point on the detected image; and $v_{PI}$ represents a boundary point of low-illuminated, which classifies the target object into the low-illuminated image region A1 and the ideal-illuminated image region A2.

The over-illuminated region A3 is usually located in a lower-half portion of the target object. An upper boundary of the over-illuminated region A3 is defined as an over-illuminated line. The boundary of the over-illuminated region A3 can be represented by the following formula:

$$d_{B_i} = d_i \times \frac{v_{PI}}{h}$$
$$d_{E_i} = d_i \times \left(1 - \frac{v_{OE}}{h}\right) \quad i = 1, 2 \quad (5)$$

In the formula (5), $v_{OE}$ represents a boundary point of an over-illuminated region, which classifies the target object into the ideal-illuminated image region A2 and the over-illuminated region A3; $d_1$ represents one dimensional magnitude of the image feature vector of the HOG 121; $d_2$ represents another dimensional magnitude of the image feature vector of the LWP 122; $d_B$ represents a start dimension of each image feature; and $d_E$ represents a terminal dimension of each image feature.

As mentioned previously, the confidence of the detecting result is dependent on the data correlation between the feature vector and the training model. In more detail, the confidence is defined by an inner product of the data of the feature vector and the training model. Therefore, the scoring value can be calculated by the following formula:

$$s(X) = s(x_1') + s(x_2') \quad (6)$$
$$= \sum_{i_1=d_{B_1}}^{d_{E_1}} w_{i_1} x_{i_1} + \sum_{i_2=d_1+d_{B_2}}^{d_1+d_{E_2}} w_{i_2} x_{i_2}$$

In the formula (6), $W=(w_1^T, w_2^T)^T$ represents a vector corresponding to the data of the training model; $X=(x_1^T, x_2^T)^T$ represents a feature vector; and s(X) represents the scoring value corresponding to the feature vector X.

Figure 7:
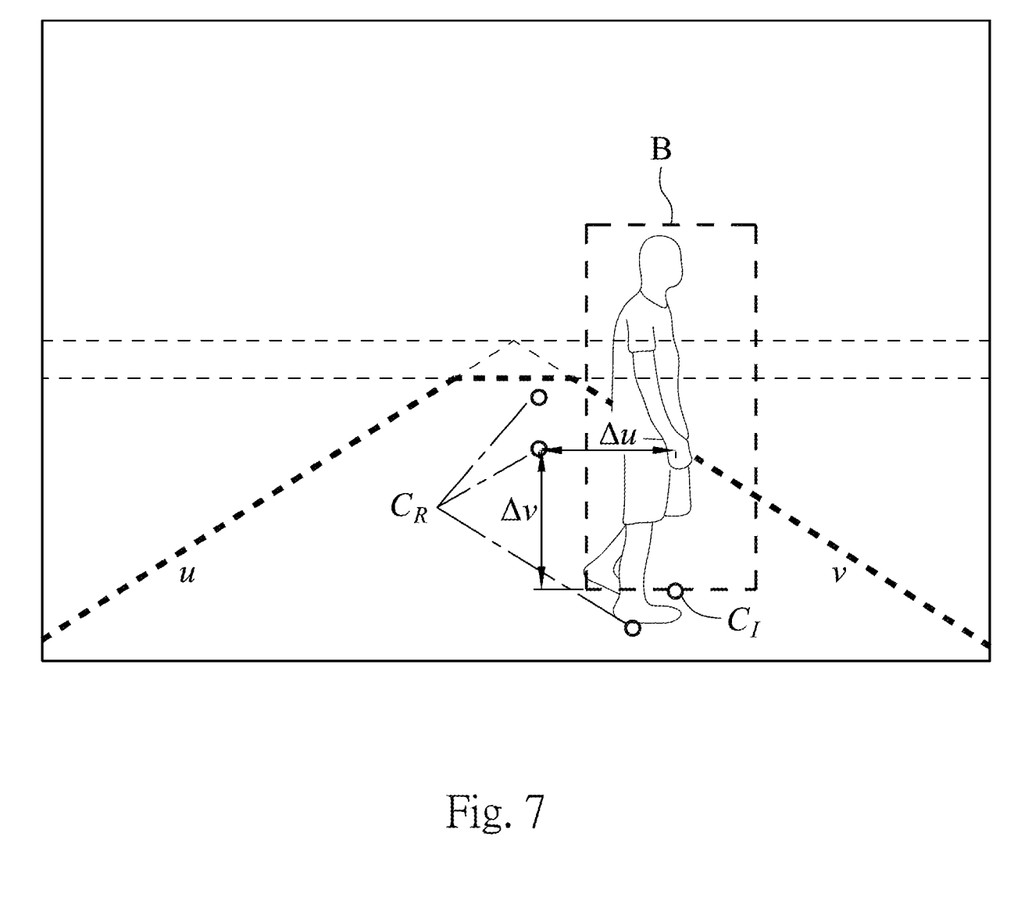
FIG. 7 is a schematic view showing obtaining a composite scoring value by performing weighted scoring on a appearance confidence and a spatial confidence according to one embodiment of the present disclosure.
Figure 8:
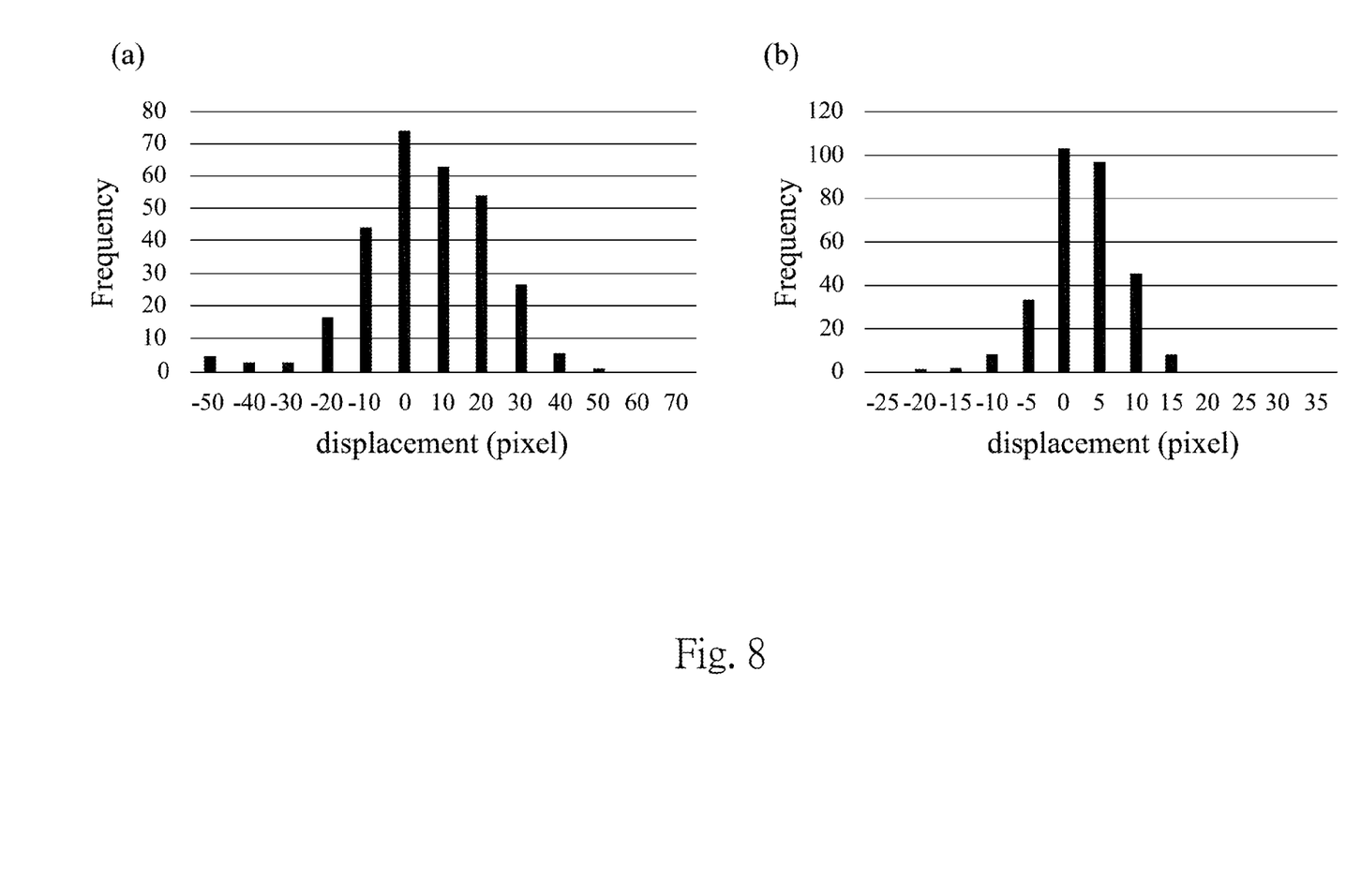
FIG. 8 is a schematic view showing obtaining a spatial confidence by using a Gaussian function according to one embodiment of the present disclosure.

FIG. 7 is a schematic view showing obtaining a composite scoring value by performing weighted scoring on an appearance confidence and a spatial confidence according to one embodiment of the present disclosure. FIG. 8 is a schematic view showing obtaining a spatial confidence by using a Gaussian function according to one embodiment of the present disclosure. The following embodiments take the pedestrian detecting system 100 as an example and similar processes can also be applied to the pedestrian detecting system 200.

By using the formula (6), the scoring value s(X) corresponding to the confidence can be obtained. For obtaining a more accurate detecting result, the image feature information captured by the image capturing unit 120 and the spatial information captured by the depth capturing unit 110 should be taken into consideration simultaneously. Commonly, a point on the detected image is obtained by the depth capturing unit 110, and a series of detected images are obtained by the image capturing unit 120. For fusing the two different mechanisms, in FIG. 8, a pedestrian image boundary region B is defined, and a position of the target object is based on a point $C_I$ located at a center of the bottom of the pedestrian image boundary region B. By using this method, influences of different heights of the target object can be reduced. At first, assuming that a spatial location of the target object relative to the pedestrian image boundary region B can be represented by $c_I(u_I, v_I)$, and a spatial location of the depth information mapped to the target object can be represented by $c_R(u_R, v_R)$. A relation between $c_I(u_I, v_I)$ and $c_R(u_R, v_R)$ can be represented by a displacement of the position in a space:

$$\Delta u = u_I - u_R$$
$$\Delta v = v_I - v_R \quad (7)$$

FIG. 8 shows that a distribution of the displacement along the u axis and the v axis is similar to a normal distribution. Therefore, a spatial relation in the u axis and the v axis can be represented by two different Gaussian functions:

$$G_u(\bullet) \sim N(0, \sigma_u^2)$$
$$G_v(\bullet) \sim N(0, \sigma_v^2) \quad (8)$$
$$P_{associate}(c_I, c_R) = G_u(\Delta u) \times G_v(\Delta v) \quad (9)$$

In the formula (9), a probability $P_{associate}$ corresponding to each coupled position ($C_I$, $C_R$) can be obtained. In more detail, to each position $C_I$, a best matching $C_R^*$ that has the highest probability can be defined. Therefore, a spatial confidence $P_{spatial}(B)$ of the pedestrian image boundary region B relative to the position $C_I$ can be obtained by the following formula:

$$P_{spatial}(B) = P_{associate}(c_I, c_R^*) \quad (10)$$

Furthermore, an appearance confidence $P_{appearance}(B)$ of the pedestrian image boundary region B can be obtained by the following formula:

$$P_{appearance}(B) = \frac{1}{1 + e^{-\alpha \times \tan^{-1}\left(s(X_B) \times \frac{\pi}{2}\right)}} \quad (11)$$

In the formula (11), $s(X_B)$ represents a scoring value corresponding to the feature vector X in the pedestrian image boundary region B. Thereafter, a composite $P_{fusion}(B)$ can be obtained by combining the formula (10) and the formula (11):

$$P_{fusion}(B) = (1 - w_r) \times P_{appearance}(B) + w_r \times P_{spatial}(B) \quad (12)$$

In the formula (12), the spatial confidence $P_{spatial}(B)$ can be adjusted by the appearance confidence $P_{appearance}(B)$. In more detail, the scoring scheme provided by the composite processing unit 130 performs weighted scoring to fuse the spatial confidence $P_{spatial}(B)$ and the appearance confidence $P_{appearance}(B)$, thereby obtaining a composite scoring value. According to the composite scoring value, the object of accurately detecting a pedestrian under the insufficiently-illuminated environment can be achieved.

To sum up, a pedestrian detecting system is provided in the present disclosure. By fusing the depth information captured by the depth capturing unit and the image feature information captured by the image capturing unit, the pedestrian detecting system is capable of performing an accurate detection to determine if the detected target object is a pedestrian. Furthermore, the Logarithm Weighted Pattern collaborates with the dynamically illuminated object detector to obtain the ideal-illuminated image region of the target object, thereby reducing overlarge voting value caused by high contrast under the insufficiently-illuminated environment. Moreover, the appearance confidence and the spatial confidence are scored in a specified weight ratio, thereby obtaining a composite scoring value for increasing the accuracy of detecting the pedestrian.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pedestrian detecting system, comprising:
 a radar detecting and obtaining spatial information of a target object;
 a camera capturing an image of the target object and recognizing the image, thereby obtaining image feature information of the target object; and
 a computer electrically connected to the radar and the camera, wherein the computer receives the spatial information and the image feature information and performs a scoring scheme to detect and determine if the target object is a pedestrian;
 wherein an appearance confidence is obtained through data transformation of the image feature information, and a spatial confidence is obtained through data transformation of the spatial information, and the scoring scheme performs weighted scoring on the spatial confidence and the appearance confidence to obtain a composite scoring value to determine if the target object is the pedestrian;
 wherein the appearance confidence is calculated using the following equations:

$$P_{appearance}(B) = \frac{1}{1+e^{-\alpha \times tan^{-1}\left(s(X_B) \times \frac{\pi}{2}\right)}};$$

where $s(X_B)$ represents a scoring value corresponding to a feature vector X in an image boundary region B of the target object;

the spatial confidence is calculated using the following equation:

$$P_{spatial}(B) = P_{associate}(c_I, c_R^*);$$

where $P_{associate}$ is a probability corresponding to each coupled position $(C_I, C_R)$, and $C_R^*$ is a best matching that has a highest probability to each position $C_I$;
 and the scoring scheme is calculated using the following equation:

$$P_{fusion}(B) = (1-w_r) \times P_{appearance}(B) + w_r \times P_{spatial}(B);$$

where Wr is a weighted ratio.

2. The pedestrian detecting system of claim 1, further comprising an image processing apparatus, wherein the image processing apparatus obtains an intermediately-illuminated image region of the target object recognized by the camera, and retains the image feature information of the intermediately-illuminated image region, wherein an illuminance of the intermediately-illuminated image region is from 10 to 80000 lux.

3. The pedestrian detecting system of claim 2, wherein the image processing apparatus obtains the intermediately-illuminated image region by using a Histogram of Oriented Gradient (HOG) and a Logarithm Weighted Pattern (LWP).

4. The pedestrian detecting system of claim 3, wherein the operation of the Logarithm Weighted Pattern comprises capturing an image intensity variance of the target object, performing a logarithm operation and obtaining a portion of the image feature information.

5. The pedestrian detecting system of claim 1, wherein the spatial information comprises a coordinate of the target object and a distance between the target object and a vehicle.

6. The pedestrian detecting system of claim 5, wherein the scoring scheme uses a Gaussian function to obtain a matching probability between the image of the target object and the distance, thereby obtaining the spatial confidence.

7. A pedestrian detecting system, comprising:
 a radar detecting and obtaining spatial information of a target object;
 a camera capturing an image of the target object and recognizing the image, thereby obtaining image feature information of the target object;
 an image processing apparatus obtaining an intermediately-illuminated image region of the target object recognized by the camera according to a relative luminance intensity of the image of the target object, and retaining the image feature information of the intermediately-illuminated image region, wherein an illuminance of the intermediately-illuminated image region is from 10 to 80000 lux; and
 a computer electrically connected to the radar and the camera, wherein the computer receives the spatial information and the image feature information, and performs a scoring scheme to detect and determine if the target object is a pedestrian;
 wherein an appearance confidence is obtained through data transformation of the image feature information, and a spatial confidence is obtained through data transformation of the spatial information, and the scoring scheme performs weighted scoring on the spatial confidence and the appearance confidence to obtain a composite scoring value to determine if the target object is the pedestrian;
 wherein the appearance confidence is calculated using the following equations:

$$P_{appearance}(B) = \frac{1}{1+e^{-\alpha \times \tan^{-1}\left(s(X_B)\times\frac{\pi}{2}\right)}};$$

where $s(X_B)$ represents a scoring value corresponding to a feature vector X in an image boundary region B of the target object;
the spatial confidence is calculated using the following equation:

$$P_{spatial}(B) = P_{associate}(c_I, c_R^*);$$

where $P_{associate}$ is a probability corresponding to each coupled position $(C_I, C_R)$, and $C_R^*$ is a best matching that has a highest probability to each position $C_I$;
and the scoring scheme is calculated using the following equation:

$$P_{fusion}(B) = (1-w_r) \times P_{appearance}(B) + w_r \times P_{spatial}(B);$$

where Wr is a weighted ratio.

8. The pedestrian detecting system of claim 7, wherein the intermediately-illuminated image region of the target object is obtained under a luminance greater than 10 lux.

9. The pedestrian detecting system of claim 7, wherein the image processing apparatus obtains the intermediately-illuminated image region through a Histogram of Oriented Gradient (HOG) and a Logarithm Weighted Pattern (LWP).

* * * * *